United States Patent
Wang et al.

(10) Patent No.: US 9,204,334 B2
(45) Date of Patent: Dec. 1, 2015

(54) BASE STATION, AND A METHOD FOR PRIORITIZATION IN A WIRELESS COMMUNICATIONS NETWORK

(71) Applicant: TELEFONAKTIEBOLAGET L M ERICSSON (PUBL), Stockholm (SE)

(72) Inventors: Hongwei Wang, Solna (SE); Marco Belleschi, Solna (SE); Bjorn Nordstrom, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 103 days.

(21) Appl. No.: 14/089,561

(22) Filed: Nov. 25, 2013

(65) Prior Publication Data

US 2015/0146528 A1   May 28, 2015

(51) Int. Cl.
| | |
|---|---|
| *H04W 28/02* | (2009.01) |
| *H04W 72/04* | (2009.01) |
| *H04W 24/02* | (2009.01) |

(52) U.S. Cl.
CPC .......... *H04W 28/0289* (2013.01); *H04W 24/02* (2013.01); *H04W 72/0486* (2013.01)

(58) Field of Classification Search
None
See application file for complete search history.

(56) References Cited

U.S. PATENT DOCUMENTS

| | | | | |
|---|---|---|---|---|
| 8,582,514 | B2 * | 11/2013 | Moberg et al. | 370/329 |
| 8,638,815 | B2 * | 1/2014 | Earnshaw et al. | 370/468 |
| 8,688,073 | B2 * | 4/2014 | Peisa et al. | 455/405 |
| 8,982,780 | B2 * | 3/2015 | Hsu | 370/328 |
| 2008/0004058 | A1 * | 1/2008 | Jeong et al. | 455/517 |
| 2010/0115355 | A1 * | 5/2010 | Hsu | 714/726 |
| 2012/0057547 | A1 * | 3/2012 | Lohr et al. | 370/329 |
| 2013/0223222 | A1 * | 8/2013 | Kotecha et al. | 370/235 |
| 2013/0308574 | A1 * | 11/2013 | Jeong et al. | 370/329 |

\* cited by examiner

*Primary Examiner* — Eunsook Choi
(74) *Attorney, Agent, or Firm* — Rothwell, Figg, Ernst & Manbeck, P.C.

(57) ABSTRACT

A method in a base station for adapting prioritization of a service of a user equipment over services of other user equipments is provided. The prioritization relates to a transmission between the base station and the user equipment at a scheduling occasion. The prioritization relates to an initial value. The base station decides (302) that the user equipment is in congestion, when an instant scheduling bit rate for the transmission in relation to a bit rate related to the service is below a first threshold. When the user equipment is in congestion, the base station adapts (304) the prioritization by down prioritizing the service of the user equipment in relation to the initial value, until a timer has expired.

12 Claims, 4 Drawing Sheets

BASE STATION, AND A METHOD FOR PRIORITIZATION IN A WIRELESS COMMUNICATIONS NETWORK

TECHNICAL FIELD

Embodiments herein relate to a base station, and a method therein. In particular, it relates to adapting prioritization of a service of a user equipment.

BACKGROUND

Wireless terminals are enabled to communicate wirelessly in a cellular communications network or wireless communication network, sometimes also referred to as a cellular radio system or cellular networks. Communication devices such as wireless terminals are also known as e.g. User Equipments (UE), mobile terminals and/or mobile stations. Wireless terminals may further be referred to as mobile telephones, cellular telephones, laptops, tablet computers or surf plates with wireless capability, just to mention some further examples. The communication may be performed e.g. between two wireless terminals, between a wireless terminal and a regular telephone and/or between a wireless terminal and a server via a Radio Access Network (RAN) and possibly one or more core networks, comprised within the cellular communications network.

The cellular communications network covers a geographical area which is divided into cell areas, wherein each cell area being served by an access node. A cell is the geographical area where radio coverage is provided by the access node.

The access node may further control several transmission points, e.g. having Radio Units (RRUs). A cell can thus comprise one or more access nodes each controlling one or more transmission/reception points. A transmission point, also referred to as a transmission/reception point, is an entity that transmits and/or receives radio signals. The entity has a position in space, e.g. an antenna. An access node is an entity that controls one or more transmission points. The access node may e.g. be a base station such as a Radio Base Station (RBS), eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each access node may support one or several communication technologies. The access nodes communicate over an air interface operating on radio frequencies with the wireless terminals within range of the access node. In the context of this disclosure, the expression Downlink (DL) is used for the transmission path from the base station to the wireless terminal. The expression Uplink (UL) is used for the transmission path in the opposite direction i.e. from the wireless terminal to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE is controlled by the radio base station.

Wireless communication has been overtaking the wired communication since the last decade of last century, and the transmitted data volume has been increased dramatically every year. From making a voice call, to sending SMS, to surfing the web, sharing data with friends and so on, wireless communication has changed significantly, and now it is playing an important role in people's normal life.

After several evolutions from GSM to WCDMA, the most recent wireless technology, LTE treats all the transmitted data in the same way as Internet protocol (IP) data and follow the same protocol and algorithms at higher layers such as e.g. Transmission Control Protocol (TCP) or User Datagram Protocol (UDP) regardless of the traffic type. It makes the system easier to maintain and also it simplifies hardware implementation. However, it makes the scheduling algorithm more complicated in the base station, in order to fulfill the Quality of Service (QoS) requirements of different traffic.

Scheduling Strategy

It is the frequency spectrum that is used to carry all the transmitted data in the wireless network. Due to the limited amount of spectrum, and increasing users and data volume, it is very critical to utilize the frequency resource more efficient than ever before. In order to fully explore the frequency resources, a scheduler in a base station is performing a resource allocation algorithm. The base station which may be referred to as eNB in LTE, is making the scheduling decision every Transmit Time Interval (TTI), where it should be decided how the frequency resource should be allocated among all the user equipments. Generally, the scheduler prioritizes user equipments according to a QoS requirement of different user equipment's data traffic; for example, control signaling is always prioritized over web data traffic. Control signaling may refer to those data carried by Singal Radio Bearer (SRB), e.g. the data using Radio Resource Control (RRC) protocol.

Transport Block Size (TBS)

To enable efficient usage of the frequency spectrum, different Modulation and Coding schemes (MCS) are utilized to maximize bits per Hertz (Hz). As known, the Quadrature Phase Shift Keying (QPSK), 16 constellation points Quadrature Amplitude Modulation (16QAM), and 64 constellation points QAM (64QAM) are all used in the LTE system. Higher order modulation means larger number of bits per Hz but lower robustness. A link adaptation algorithm is used to select the MCS, according to a Hybrid Automatic Repeat Request (HARQ) operation as well as the user equipment's channel condition and power condition.

Based on the number of allocated Physical Resource Blocks (PRBs), and the selected MCS, the TBS is calculated according to 3GPP 36.213, Table 7.1.7.2.1-1. According to such table, the TBS may vary from 16 bits to 75376 bits with 20 Mhz bandwidth System where the maximum number of bits is increased linearly with the bandwidth. Simply, the TBS may be imagined as the amount of information bits a user equipment can transmit within one scheduling opportunity. The information bits mentioned here means the Media Access Control (MAC) Packet Data Unit (PDU) size which relates to bits transmitted in the physical layer, including both a MAC header e.g. mac control elements, and a MAC payload.

Delay Sensitive Traffic

In the evolution of wireless communication networks, more and more applications are using LTE as a data transmission network. Throughput turns not to be the only key parameter of transmission quality, but also other requirements acquire importance depending on the QoS of some specific traffic. For instance, Voice over IP (VoIP) is one type of traffic that is less throughput sensitive, but packet delay sensitive. VoIP is a protocol for the delivery of voice communications and multimedia sessions over IP networks, such as the Internet. A lower packet delay gives a better quality of a VoIP service than higher physical bit rate. Simply said, if an Real-time Transport Protocol (RTP) packet of VoIP cannot be transmitted on time, it will be useless. The real time video and online gaming are also classified as delay sensitive traffic.

VoIP Traffic Mode

VoIP traffic comprises of two different modes, one TALK mode and one Silence Indicator (SID) mode. Literally, TALK mode indicates that a user equipment is talking, while SID mode indicates that the user equipment is listening. A packet comprises two kinds of data, control information such as a header, and user data also referred to as payload. The packets are generated with different size and intensity for the two modes. It is commonly 20 ms interval time during TALK Mode and 160 ms during SID mode. Typically, an RTP payload size in Talk mode is much larger than the packet Size in SID mode, depending on the used codec on the Adaptive Multi Rate (AMR) codec. For example, by using the AMR codec, with 12.2 kbps, it gives around 256 bits of RTP payload. Without Robust Header Compression (ROHC), all RTP/UDP/IP/Packet Data Convergence Protocol (PDCP)/RLC headers may make a Radio Link Control (RLC) Service Data Unit (SDU) packet at a MAC layer during TALK which is as much as 594 bits considering IPv4 is used. Note that header sizes of different protocol level may be slightly different, depending on the configurations.

Delay Based Scheduling (DBS)

As mentioned above, a scheduler performs scheduling decision every TTI to allocate resources among user equipments. Different scheduling algorithms are employed, in order to meet different QoS requirements. Round Robin (RR) scheduling and Proportional Fair (PF) scheduling are two commonly used scheduling algorithms, where the aim of RR is to get the absolute fairness, while PF aims to maintain a balance level between fairness and system throughput.

Additionally, Delay Based Scheduling (DBS) is another algorithm that is optimized for delay sensitive traffic, such as VoIP traffic. It considers the packet delay of different user equipments when performing prioritization among the user equipments. In most of cases, the user equipments with older packet in a buffer is prioritized over the others.

In order to meet the QoS requirement most of the packets of delay sensitive traffic shall arrive within a time budget. For the sake of simplicity, VoIP is taken as one example of delay sensitive traffic to illustrate this problem. VoIP packets are generated periodically as described above. According to a delay requirement of each single packet, in theory, the base station such as an eNB must always maintain a minimum bit rate for each VoIP user equipment in order to meet the requirement.

Assuming that 12.2 kilobits per second (kbps) is used as the VoIP RTP codec rate, if considering also the protocol headers, it will need at least 25-200 kbps to transmit the 12.2 kilobits (Kbits) RTP VoIP traffic, depending on the maximum number of segmentations for one VoIP packet. In case of a bad channel condition, the scheduler does not give enough TBS for the whole VoIP talk packet, instead RLC may chop the whole packet into small segments and send them one by one in a physical layer with a small TBS. However, one more segment requires one more MAC header which will increase the total bits rates on MAC Layer. If any of those small segments cannot be successfully transmitted on time due to any reason, all those transmitted segments will be discarded, and the QoS requirement will fail. One obvious reason in this case may be that the scheduling capacity is lower than the required bit rate.

The prior art link adaptation has been designed to adapt the modulation scheme according to the Noise Ratio (SINR), in order to achieve a stable transmission error rate, e.g. 10% retransmission. However this strict algorithm used to be too robust and could not work well in case of congestion, which results into huge buffer queuing and also starvation to each other. Thus a problem is that when the user equipment in congestion e.g. a bad channel condition such as e.g. temporarily in channel fading dip or at the cell border with strong interference, the base station cannot provide a certain VoIP user equipment with the required bit rate. The consequence is that the QoS requirement of such a VoIP user equipment will not be met regardless of which scheduling algorithm has been used, and all the scheduled resources allocated to this user equipment are useless and wasted. Moreover, according to the basic principle of DBS, those user equipments will very likely get higher priority than other user equipments, which may leave no scheduling resources for other user equipments in the same cell.

In order to illustrate the problem, a simple example is used to clarify it. Assuming that one VoIP Packet is 596 bits, i.e. 73 bytes, no ROHC, IPv4, AMR 12.2 Codec, and a user equipment that is at the cell edge where the Signal to Interference plus SINR is very low and the power is limited, only very small TBS, can be used in order to meet the required 10% HARQ Block Error Rate (BLER). Since a MAC Header may be as large as 7 bytes, a typical TBS that is used in the bad SINR is 9 bytes to be able to carry minimum 2 bytes of payload. One byte is a grouping of 8 bits. According to 3GPP 36.213, Table 7.1.7.2.1-1, 9 bytes may be transmitted via physical layer during one transmission with MCS 2 and 2 SBs. In a worst case scenario, e.g. if also Buffer Status Report (BSR) and Power Headroom Report (PHR) information are transferred within the MAC PDU, the MAC headers may be 7 bytes, which implies that only 2 bytes may be used for transmitting the payload. Since the VoIP traffic is generated every 20 ms, but within the 20 millisecond (ms) only 2*20 payload bytes can be transmitted, this means that the base station will never be able to empty the buffer of the user equipment and satisfy latency requirements. Instead, the buffer of the user equipment will keep piling up. At the same time this user equipment is wasting one scheduling opportunity every TTI. In case there are other user equipments in the system, they might be prevented from getting scheduled and hence they may suffer from starvation issues. FIG. 1 illustrates one example of how a buffer of a user equipment is piling up in an extreme case where all the scheduling resources are wasted by this user equipment. An PDCP VoIP packet of 73 bytes is considered.

Note that FIG. 1 shows one of the extreme case which may be rare in a real situation, but still it illustrates the situation where the scheduled bits within 20 ms cannot catch up the coming data of this user equipment. When it happens, all scheduling resources are wasted and starving the other user equipments in the system. This problem will be linearly worse by the increased number of active user equipments in the system.

SUMMARY

It is therefore an object of embodiments herein to improve the performance of a wireless communications network.

According to a first aspect of embodiments herein, the object is achieved by a method in a base station for adapting prioritization of a service of a user equipment over services of other user equipments. The prioritization relates to a transmission between the base station and the user equipment at a scheduling occasion. The prioritization relates to an initial value. The base station decides (302) that the user equipment is in congestion, when an instant scheduling bit rate for the transmission in relation to a bit rate related to the service is below a first threshold. When the user equipment is in congestion, the base station adapts (304) the prioritization by down prioritizing the service of the user equipment in relation to the initial value, until a timer has expired.

According to a second aspect of embodiments herein, the object is achieved by a base station for adapting prioritization of a service of a user equipment over services of other user equipments. The prioritization relates to a transmission between the base station and the user equipment at a scheduling occasion. The prioritization relates to an initial value. The base station comprises a deciding circuit configured to decide that the user equipment is in congestion, when an instant scheduling bit rate for the transmission in relation to a bit rate related to the service is below a first threshold. The base station further comprises an adapting circuit configured to, when the user equipment is in congestion, adapt the prioritization by down prioritizing the service of the user equipment in relation to the initial value, until a timer in the base station has expired.

When the user equipment is in congestion the scheduler is not able to clear the buffer quick enough to meet the required bit rate of this user equipment to fulfil the QoS requirement of this user equipment, in worse case a buffer of the user equipment is even piling up instead of going down. By down prioritizing the service of the user equipment in relation to the initial value, a scheduler can free the resources allocated to the user equipment in congestion to be used by other user equipments, which in turn enhances the performance in the wireless communications network.

An advantage with embodiments herein is that the overall wireless communication network capacity will be improved by the adaptation of the prioritization by down prioritizing the service of the user equipment, since the scheduling resources is used more efficiently by limiting the resources used for out-of-date data.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed. As stated above, some user equipments in a communication system occupy scheduling resources but do not generate any value. This prevents other user equipments in the system to get scheduling resources, which results in a poor performance of the communications system. The current solutions in prior art base stations are all trying to meet those requirements, by all different costs. However, due to the temporally variation of the channel condition or interference which may result in a very bad SINR, meaning that the user equipment is in congestion. This in turn results in that the user equipment's requirements may not be able to be satisfied or may be able to be satisfied but with huge expense in sense of scheduling resources which might starve the other user equipments in the same cell. Prior art solutions like congestion control where the user equipment is removed due to bad SINR or congestion will not help this case, where a user equipment's SINR is changing quickly, bringing the user equipment in congestion back and forth, making the prior art congestion control react too late or too early by unnecessarily removing the user equipments which could recover by itself.

Embodiments herein provide a technique to facilitate a base station such as a scheduler of a base station to balance resources in a better way to achieve the highest service capacity.

Embodiments herein provide some algorithms that improves the performance of the communications system by modifying prioritization between user equipments such that occupation of unnecessary resources are decreased considerably. The modifying prioritization between user equipments may be performed by scheduling bits for each scheduling occasion to down prioritize user equipments which are in congestion, e.g. for which QoS requirements fails.

Figure 1:
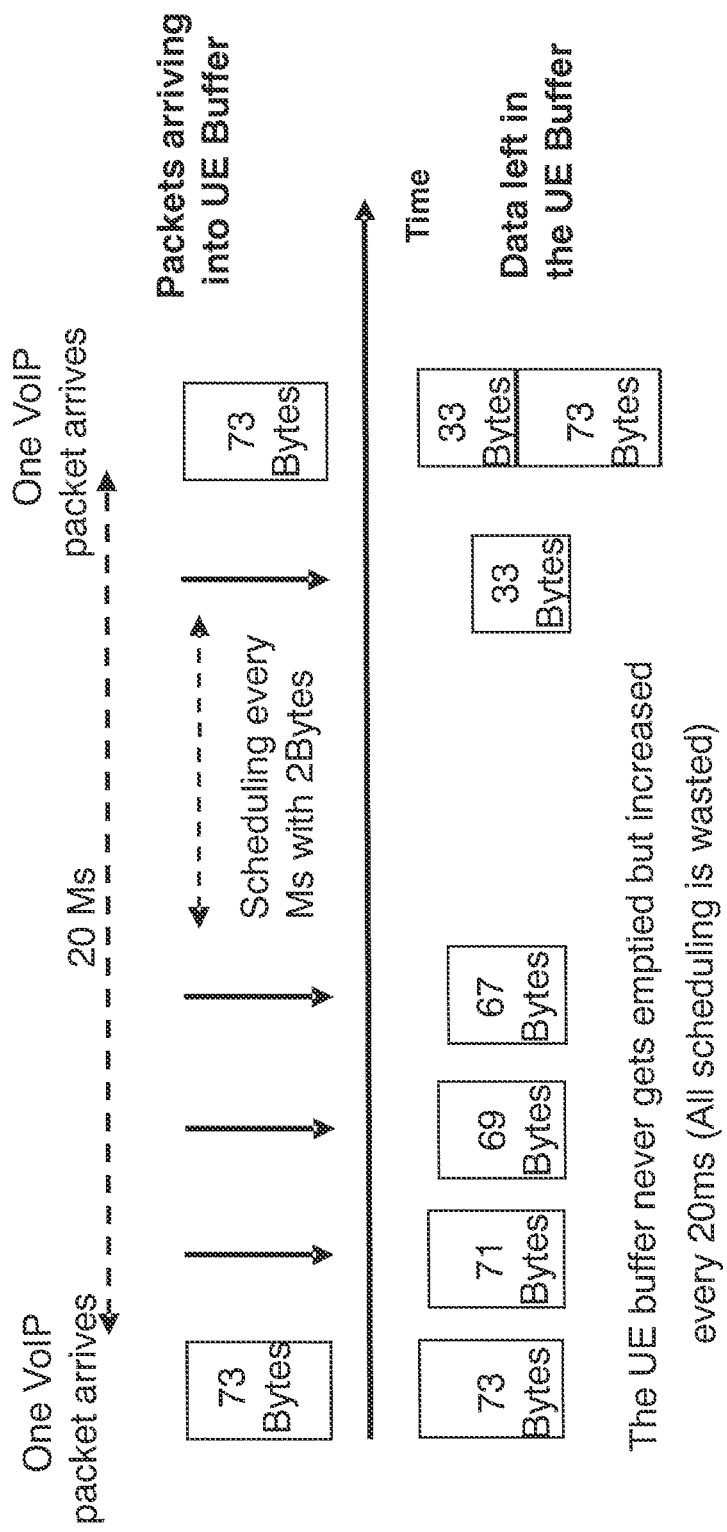
FIG. 1 is a schematic block diagram illustrating a buffer of a user equipment according to prior art.
Figure 2:
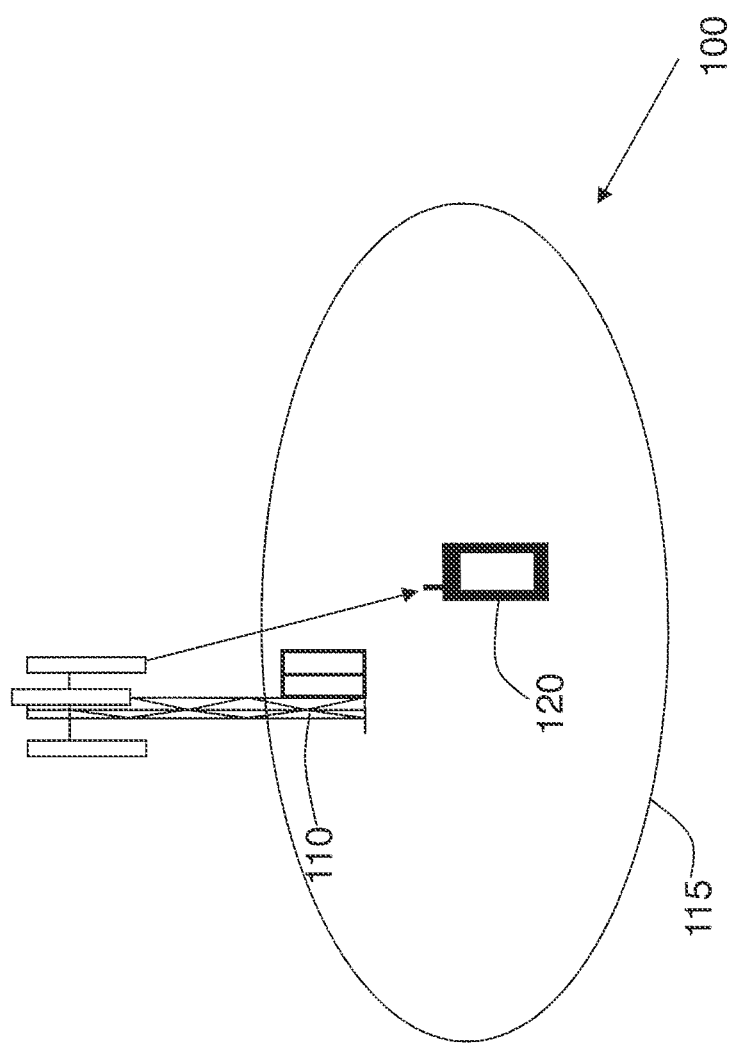
FIG. 2 is a schematic block diagram illustrating embodiments of a wireless communications network.

FIG. 2 depicts an example of a wireless communications network 100 according to a first scenario in which embodiments herein may be implemented. The wireless communications network 100 is a wireless communication network such as an LTE, WCDMA, Wimax, or any cellular network or system.

The wireless communications network 100 comprises plurality of network nodes whereof one, a base station 110 is depicted in FIG. 2. The base station 110 is a base station which may be referred to as a transmission point, a radio base station, an eNB, an eNodeB, an Home Node B, an Home eNode B or any other network node capable to serve a wireless terminal such as a user equipment or a machine type communication device in a wireless communications network. The base station 110 serves a cell 115.

A number of user equipments operates in the wireless communications network 100, whereof one, a user equipment 120 is shown in FIG. 2. The user equipment 120 is within radio range of the base station 110, this means that it may communicate wirelessly in the wireless communication network 100 via the base station 110.

The user equipment 120 may e.g. be, a wireless device, a mobile wireless terminal, a wireless terminal, a mobile phone, a computer such as e.g. a laptop, a Personal Digital Assistants (PDAs) or a tablet computer, sometimes referred to as a surf plate, with wireless capability, or any other radio network unit capable to communicate over a radio link in a wireless communications network. Please note the term user equipment used in this document also covers other wireless devices such as Machine to machine (M2M) devices.

Figure 3:
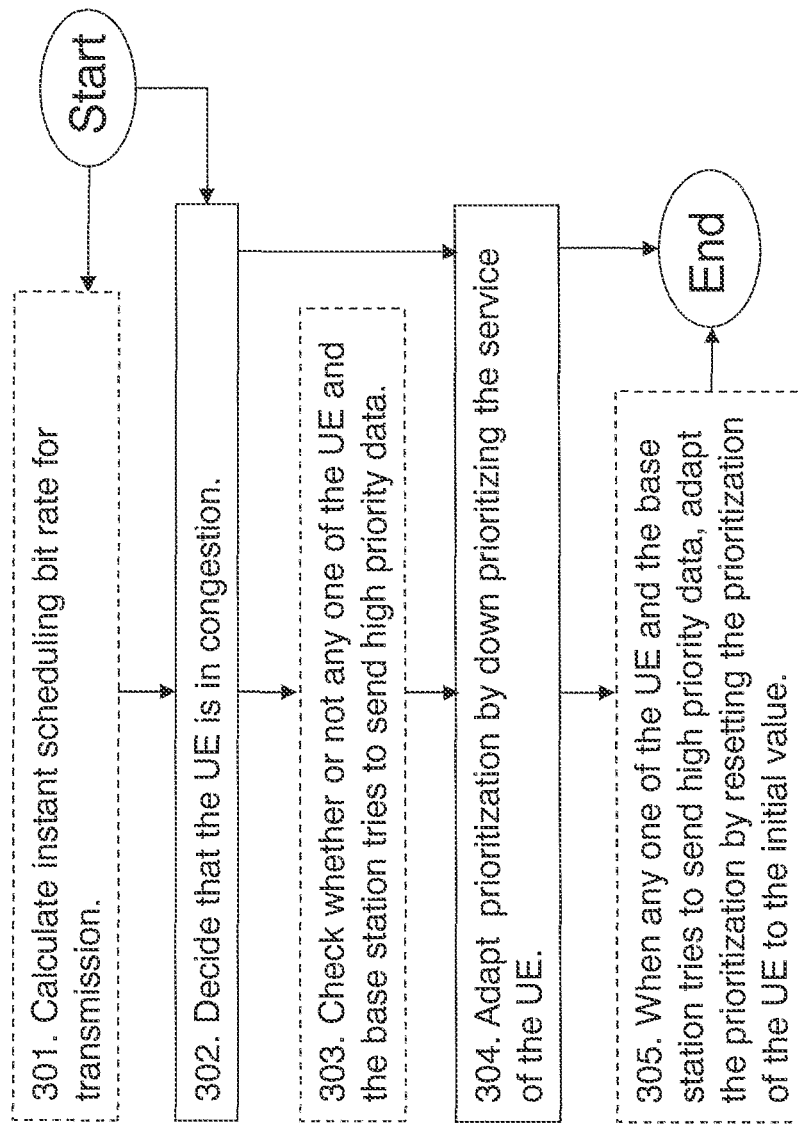
FIG. 3 is a flowchart depicting embodiments of a method in a base station.

Example of embodiments of a method in the base station 110 for adapting prioritization of a service of a user equipment 120 over services of other user equipments 122 will now be described with reference to a flowchart depicted in FIG. 3. The prioritization relates to a transmission between the base station 110 and the user equipment 120 at a scheduling occasion. The prioritization is related relates to an initial value. The initial prioritization value may e.g. comply with a defined priority of each QoS Class Identifier (QCI), e.g. according to 3GPP TS 23.203 Table 6.1.7. It may also comply with a scheduler metric used for each QCI, e.g. Round Robin, Proportional Fair, or Delay Based scheduling. For example, the initial Prioritization of Real Time Gaming service, QCI3 in Table 6.1.7, which is using Round Robin scheduling algorithm, is corresponding to the time delay since last scheduled with the Priority zone 3. Therefore, down prioritized this service, may be either to decrease the time delay since last scheduled or decrease the priority zone.

In an example scenario, the user equipment 120 may have user data to upload to base station 110, where packets comprising the user data to be transmitted are stored in a user equipment buffer comprised in the user equipment 120. Further, the base station 110 may have user data that the user equipment 120 is intend to download, where packets comprising the user data to be transmitted are stored in an associated user equipment buffer in the base station 110. The transmission is related to the service. The service may e.g. be Voice if the transmission relates to a phone call, Video if the transmission e.g. relates to a film to be downloaded, real-time video call, online gaming e.g. relating to very delay sensitive data transmission to the user equipment 120. Each type of service may have its own requirement on QoS, and especially for real time service like Video and VoIP which have strict delay and bit rate requirements. As mentioned above, embodiments herein provide a technique to facilitate base station 110 such as e.g. a scheduler of base station 110 to balance the resource in a better way to achieve the highest service capacity.

The method comprises the following actions, which actions may be taken in any suitable order. Dashed lines of some boxes in FIG. 3 indicate that this action is not mandatory.

Action 301

In order to be able to decide which state the user equipment 120 is currently in, regarding whether or not being in congestion, which will be performed in Action 302 below, the base station 110 may need some relevant information to use as a basis for the decision. Thus, in this action, the user equipment 120 may calculate an instant scheduling bit rate for the transmission and the user equipment 120 may establish a bit rate related to the service. This may be obtained because the instant scheduling bit rate indicates how fast the scheduler can empty the user equipment buffer, in sense of scheduled bits/ms for a certain user equipment such as the user equipment 120 at the current time. The bit rate related to the service defines how fast the user equipment buffer can be filled up, in sense of the new coming bits/sec for a user equipment such as the user equipment 120 with a certain service.

When calculating the instant scheduling bit rate, a SINR may be considered, e.g. of a dedicated channel for data transmission, Physical Uplink Shared Channel (PUSCH) if the transmission is related to LTE Uplink, and Physical Downlink Shared Channel (PDSCH) if transmission is related to LTE Downlink. In some embodiments herein the instant scheduling bit rate may further be based on a scheduling algorithm where e.g. a cell load is considered implicitly. Therefore, it is the instant scheduling bit rate that is considered. The instant scheduled bits are in an application layer. The protocol headers added between the payload data and the final scheduling Packet Data Unit (PDU), e.g. an Application Layer such as RTP, a Transport layer such as TPC/UDP, a network Layer such as IP, a Data link layer such as PDCP/RLC/MAC, are removed when calculating the instant scheduling bit rate.

Action 302

The base station 110 decides that the user equipment 120 is in congestion, when the instant scheduling bit rate for the transmission in relation to the bit rate related to the service is below the first threshold. The base station 110 knows the bit rate of a certain service, and may compare the instant scheduling bit rate and the required service bit rate. For example, if the instant scheduling bit rate is not X times higher than the new coming data rate, the user equipment 120 may be defined as in bad condition, i.e. in congestion. X is a margin which may be the first threshold, where X=2-4 may be a good example for as an example for a Voice Service such as in the previous example based on a typical network capability. The optimized value X may be depended on the network capacity, in sense of the number of user equipments that may be scheduled at the same TTI, network load in sense of connected user equipments and also the requirement of the QoS of each service. In a simple example to illustrate the relationship, the X shall be a large value, if network capacity is very low or cell load is very high.

The term congestion used herein means that the number of user equipments that is requesting to be scheduled is larger than the base station's 110 scheduling capacity. A reason for the user equipment 120 being in congestion may be that the SINR of the user equipment 120 is low which results in lots of segmentation.

The algorithm may be applied for user equipments whenever they are scheduled.

For example, when entering the procedure in action 301, it is a scheduled user equipment. It may mean that, once the user equipment 120 is scheduled, and the base station 110 has realized that the scheduled bits are not able to fulfil the QoS, i.e. the user equipment 120 is in congestion, the base station 110 may try to prevent further scheduling, down prioritize, for a certain time, e.g. by means of a timer. It is the scheduling candidates that are checked when a timer is running, to see if a user equipment is out of congestion. By doing this, the base station 110 makes sure that the user equipment such as the user equipment 120 is scheduled at least once per timer cycle. This may be of importance, especially in UL, because this is the way to be able to update the SINR by check the received Data in UL.

This action of deciding that the user equipment 120 is in congestion, may thus be triggered when the user equipment 120 is a scheduling candidate.

In some embodiments, the user equipment 120 has been reset to the to the initial value. This may be because the user equipment 120 is out of congestion again. In these embodiments, the service of the user equipment 120 may not be down prioritized again, until the timer has expired.

Action 303

In some embodiments, when the user equipment 120 is in congestion, the base station 110 checks whether or not any one of the user equipment 120 and the base station 110 tries to send high priority data related to the service. This may be performed in order to not delay any high priority activities, like handover, network configurations or any type of control signals requiring minimum delay. This may for example be if a video service of the user equipment 120 being in congestion is down prioritized due to the low scheduling bit rates compared with Video bit rate. However when the user equipment 120 e.g. is starting to do handover, which requires minimum delay, the down prioritization should be recovered to schedule the user equipment 120 as soon as possible, otherwise, the handover may fail when the user equipment 120 is moving too far away.

Action 304

When the user equipment 120 is in congestion, the base station 110 adapts the prioritization by down prioritizing the service of the user equipment 120 in relation to the initial value, until a timer has expired. The timer may start at the moment when the service of the user equipment 120 is down prioritized. Note that the down prioritizing should not be changed if the user equipment 120 is scheduling during the timer, still the down prioritization should hold until the timer expired. For how long the timer may be run is described below. This will be more explain below.

In some embodiments, the down prioritizing of the service of the user equipment 120 may be represented by decreasing a priority of the user equipment 120 of a current service, or decreasing a category of the user equipment 120. The category may e.g. be defined by the operator for different subscription Thus in some embodiments, the service is a delay sensitive service. In these embodiments the down prioritizing the service of the user equipment 120 may be performed by removing or decrease the delay. For example, for those services using proportional fair scheduling, down prioritizing may be performed by removing or decrease the bit rate, for those services using round robin scheduling, down prioritizing may be performed by removing or decrease the counted time since last scheduled.

Action 305

In some embodiments, when any one of the user equipment 120 and the base station 110 tries to send high priority data related to the service, the base station 110 adapts the prioritization by resetting the prioritization of the service of the user equipment 120 to the initial value. This may be performed during the timer running time, since after the timer has expired, the user equipment 120 will no longer be down prioritized.

The following text is related to any suitable embodiment described above.

According to some embodiments, a way to implement a down-prioritization of the user equipment 120 for which a QoS requirement fails will be described below.

In short and general, a base station may always try to rank all the user equipments who are requiring resources, for every TTI, and always those user equipments with higher rank get resource prior to those user equipments with lower rank. There are a couple of ways to rank services of user equipments. The QoS priority of each QCI may be used to distinguish between service, and within each service it is the scheduling algorithm that is used to prioritizing among user equipments with same service. For example, delay sensitive service like VoIP, which is using delay based scheduling, the user equipment with higher delay is used to have high priority, or rank. For user equipments using proportional fair scheduling, a higher rank means lower bit rate. For those service using round robin scheduling, it is the user equipment with longer delay since last time it was scheduled it got a higher rank.

In short, to down-prioritize the service of the user equipment 120 may e.g. be to decrease the user equipment's 120 priority of current service, or decrease the user equipment's 120 category, etc. For example, if the user equipment 120 acquired additional prioritization from a certain service such as e.g. VoIP, but the base station 110 detected that the user equipment 120 is under congestion and could not meet the QoS requirement of this service, the base station 110 may down prioritize the user equipment 120 by removing the additional priority from this certain service. Moreover delay is always a very important part of the prioritization metric of those delay sensitive service such as voice or video. Often a user equipment with higher delay is prioritized over those with lower delay; therefore the base station 110 may remove the delay by a certain value or to a certain value, to be able to down-prioritize the service of the user equipment 120 in congestion e.g. temporally. There may be different ways to achieve the down prioritization, and they may all depend on the traffic type and also the scheduling metric of the user equipment 120. So a basic of embodiments herein may be when to down prioritize the user equipment 120.

Please note that it is not acceptable to keep down prioritizing of the service of the user equipment 120 in congestion all the time. Therefore the down prioritizing is timer based, which means that the down-prioritization shall be kept until the timer expires. The service of the user equipment 120 shall only be down prioritized for a certain time, and should not be down prioritized again, until it has been scheduled for the transmission. This is e.g. because the user equipment 120 needs to be scheduled to be able to update the UL SINR to be able check if the user equipment 120 has recovered from the congestion.

The timer may be a HARQ timer or multiple HARQ timers, such as one Hybrid Automatic Repeat Request Round Trip Time (HARQ RTT). The reason of using the HARQ procedure is because it is more likely that the UL channel condition and potentially the user equipment 120 power head room will be changed when UL data has arrived, e.g. when the HARQ RTT has expired, and also it is just to reuse the HARQ timer for a simple implementation.

The method described above will now be explained more in detail in the following example of embodiments of the method. The method may also be referred to as an algorithm. The method steps may not be taken in the order described below, but may be taken in any suitable order.

Step 1: The base station 110 judges if the user equipment 120 is under congestion, and resets the user equipment's priority to be the default value, such as e.g. the initial value, if the user equipment 120 is recovered from the congestion situation.

Step 1 relates to action 301, 302, 303 and 304 above. The flow of the method may be triggered when the user equipment 120 is a scheduling candidate. An algorithm is used to identify whether or not the user equipment 120 is under congestion and requires priority modification. As mentioned above, the base station 110 shall compare the instant scheduling bit rate and the service bit rate in order to know if the user equipment 120 is under congestion or not. This relates to Action 302.

When calculating the instant scheduling bit rate, only the Scheduled Bits in application layer shall be calculated by removing all the protocol headers in physical layer and transmission layer such as e.g. MAC, RLC, PDCP, TCP and IP. This relates to Action 301.

The instant scheduling bit rate with unit Bits/Second may be compared with the required data bit rate also with unit Bits/Second. If the scheduled bit rate is below a first threshold, such as e.g. is not X times larger than the service bit rate, the user equipment 120 is considered as being under congestion, i.e. the base station 110 decides that the user 120 equipment is in congestion. Note that e.g. 2-4 may be a good value for the first threshold X, however may vary depending on the cell capacity and different ways of deployment.

Step 2: If the user equipment 120 is under congestion, the base station checks whether or not the user equipment 120 is carrying any signaling.

The base station 110 resets the priority back to the original value, if the user equipment is carrying any signal. This is known to the base station by default in most of case. This relates to Action 305.

Step 3: For those user equipments that are under congestion and which not carrying any signalling, such as e.g. when the user equipment 120 does not carrying any signalling, a timer will be used to control the when to down prioritize the UE.

The timer may be started when the user equipment 120 under congestion is scheduled.

Step 3 relates to Action 304. When the timer expires, the down prioritization may be reset back to the initial value. By doing this, the base station 110 may schedule the user equipment 120 once per timer cycle to give the user equipment 120 a chance to update with new channel information. As may be seen, the timer is e.g. started after the user equipment 120 was scheduled, which means in ideal case, the user equipment 120 will always be scheduled once the timer is expired to enter the next timer cycle with down prioritized user equipment 120, in case the user equipment 120 is staying in congestion, i.e. in bad SINR all the time. This may be performed to see if the user equipment 120 has got out of congestion, especially for UL, where the base station 110 is using the scheduled UL data to estimate the CQI of UE. In DL, this may also help to keep the user equipment 120 RRC connected.

In some embodiments, if no timer has been started, which means no action has been taken, the base station 110 down prioritizes the user equipment as described above.

The timer may not be set to be too high, and a good example may an multiple of the HARQ RTT timer which e.g. may be 8 ms of normal case, but 16 ms when TTI bundling is used in UL. In UL a channel estimation such as SINR and PHR may be based on received UL data, which means after scheduling the user equipment 120, the channel information e.g. related to the SINR and PHR, will not be updated until the UL data has arrived to the base station 110 which means that the HARQ timer has expired. An ideal setting of the timer may be multiple times of the HARQ RTT, but anything in between may not make any difference in theory.

An advantageous example of down prioritizing the service of the user equipment 120 is that the base station 110 removes all the prioritization that the user equipment 120 gets from the service. For example, if the user equipment 120 have got additional prioritization from a certain service such as e.g. VoIP, but the base station 110 has detected that the user equipment 120 is under congestion and cannot meet the QoS requirement of this service such as the VoIP, the base station 110 may down prioritize this user equipment 120 by removing the additional priority from this certain service of VoIP.

In this way, embodiments herein utilize the scheduling resource in a more efficient way, to increase the system capacity where more user equipments will be served. The embodiments herein prevent starvation between users due to excessive fragmentation of MAC PDUs in bad channel conditions. Starvation refers the case where limited scheduling resources are used up by one user equipment, and leave no scheduling resource or few resources to other user equipments, which is starved. Furthermore the scheduling resource may mean the PRB resources of a data channel, such as PUSCH/PDSCH, control channel resources like PDCCH, or the scheduling entities every TTI of the network.

The algorithm is configured per service, such as a QoS Class Indicator bearer of the service. However, it may not be the same in DL. In UL the user equipment 120 may be scheduled as one entity, and it is the service with highest priority present in the whole user equipment 120, for example, if the user equipment 120 has two services, one is configured with this down prioritization algorithm, the other is not, the scheduler should check only the configuration of the service with highest priority. However in DL when the scheduler may apply for every single service, QCI, the operator may define a user equipment such as the user equipment 120 with a Very Important Person (VIP) service, which VIP service may not be selected to be down prioritized.

Another example to make it more clear, in DL, if the user equipment 120 has data belonging to both a service A and a service B, and the service A has higher priority than the service B originally, but the Service A is configured with the algorithm according to embodiments herein, but not the service B. Then in case of the user equipment 120 being in congestion, the service A may be down prioritized even lower than service B, and then the data of Service B may be sent before sending the data of the service A.

Note that in some embodiments herein only the SINR may be needed to be considered explicitly, cell load may be covered by the nature of the scheduler where it is always comparing all the user equipments to make the final decision, for example, two user equipments with same SINR are both in congestion in two different cells, one high load cell and one low load cell, the user equipment in the high load cell will not be scheduled due to the down prioritization, but the user equipment in the low load cell will be scheduled even though it is already down prioritized.

The down prioritization of the service of the user equipment 120 according to embodiments herein may not be intended help the user equipment 120 to recover from congestion. Instead it just postpone the user equipment 120 for a while and wait for the SINR recovery, which means once the SINR has been recovered, it will be a real recovery from the congestion.

Figure 4:
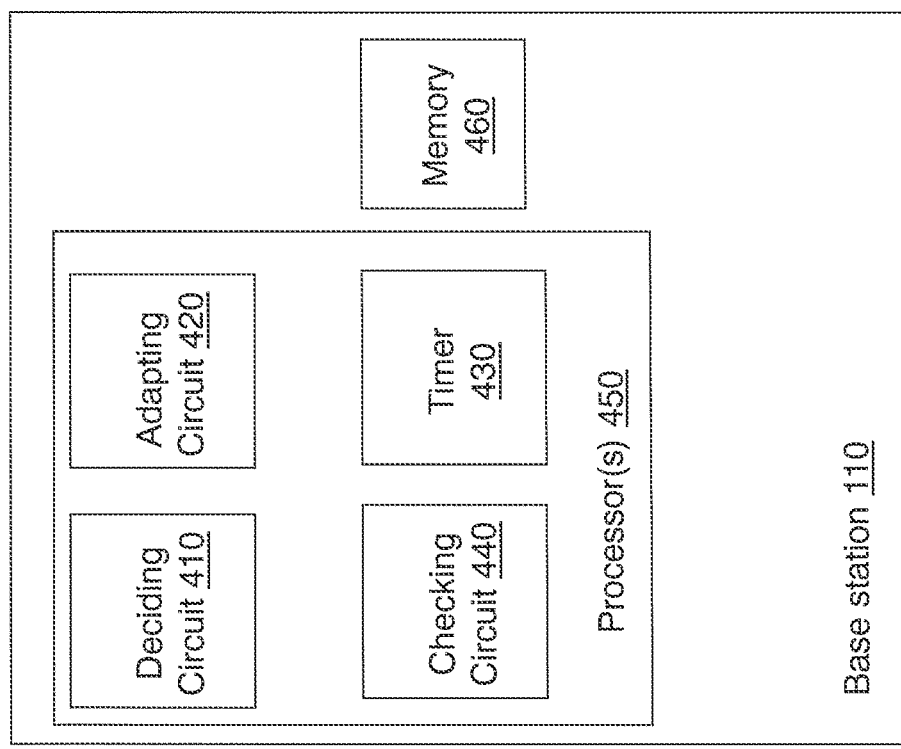
FIG. 4 is a schematic block diagram illustrating embodiments of a base station.

To perform the method actions for adapting prioritization of a service of a user equipment 120 over services of other user equipments 122, described above in relation to FIG. 3, the base station 110 comprises the following arrangement depicted in FIG. 4. Some or all parts of the arrangement may be implemented in a scheduler of the base station 110. As mentioned above the prioritization relates to a transmission between the base station 110 and the user equipment 120 at a scheduling occasion, and the prioritization relates to an initial value.

The base station 110 comprises a deciding circuit 410 configured to decide that the user equipment 120 is in congestion, when an instant scheduling bit rate for the transmission in relation to a bit rate related to the service is below a first threshold.

The deciding circuit 410 may be configured to trigger the deciding that the user equipment 120 is in congestion, when the user equipment 120 is a scheduling candidate.

The base station 110 further comprises an adapting circuit 420 configured to, when the user equipment 120 is in congestion, adapt the prioritization by down prioritizing the service of the user equipment 120 in relation to the initial value, until a timer 430 in the base station 110 has expired.

The adapting circuit 420 may further be configured to down prioritize the service of the user equipment 120 by decrease a priority of the user equipment 120 of a current service, or decrease a category of the user equipment 120.

The service may be a delay sensitive service, and the adapting circuit 420 may further be configured to down prioritizing the service of the user equipment 120 by removing or decrease the delay.

In some embodiments, the user equipment 120 may be adapted to have been reset to the to the initial value, In these embodiments, the adapting circuit 420 may further be configured to not down prioritize the service of the user equipment 120 again, until the timer 430 has expired.

In some embodiments the base station 110 further comprises a checking circuit 440 configured to, when the user equipment 120 is in congestion, check whether or not any one of the user equipment 120 and the base station 110 tries to send high priority data related to the service.

In these embodiments, the adapting circuit 420 may further be configured to, when any one of the user equipment 120 and the base station 110 tries to send high priority data related to the service, adapt the prioritization by resetting the prioritization of the service of the user equipment 120 to the initial value.

The embodiments herein for adapting prioritization of a service of a user equipment 120 over services of other user equipments 122 may be implemented through one or more processors, such as a processor 450 in the base station 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the base station 110. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 460 comprising one or more memory units. The memory 460 is arranged to be used to store obtained information, BLER values, data, configurations, schedulings, and applications to perform the methods herein when being executed in the base station 110.

Those skilled in the art will also appreciate that the deciding circuit 410, the adapting circuit 420, the checking unit 440 and the timer 430 described above may refer to a combination of analog and digital circuits, and/or one or more processors configured with software and/or firmware, e.g. stored in the memory 460, that when executed by the one or more processors such as the processor 450 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a base station for adapting prioritization of a service of a user equipment over services of other user equipments, which prioritization relates to a transmission between the base station and the user equipment at a scheduling occasion, and which prioritization relates to an initial value, the method comprising:
   deciding that the user equipment is in congestion, when an instant scheduling bit rate for the transmission in relation to a bit rate related to the service is below a first threshold, and
   when the user equipment is in congestion, adapting the prioritization by down prioritizing the service of the user equipment in relation to the initial value, until a timer has expired.

2. The method according to claim 1, wherein the down prioritizing the service of the user equipment is represented by decreasing a priority of the user equipment of a current service, or decreasing a category of the user equipment.

3. The method according to claim 1, wherein the service is a delay sensitive service, and wherein the down prioritizing the service of the user equipment is performed by removing or decrease the delay.

4. The method according to claim 1, wherein the action of deciding that the user equipment is in congestion, is triggered when the user equipment is a scheduling candidate.

5. The method according to claim 1, wherein the user equipment has been reset to the initial value, and wherein the service of the user equipment is not down prioritized again, until the timer has expired.

6. The method according to claim 1, further comprising:
   when the user equipment is in congestion, checking whether or not any one of the user equipment and the base station tries to send high priority data related to the service, and
   when any one of the user equipment and the base station tries to send high priority data related to the service adapting the prioritization by resetting the prioritization of the service of the user equipment to the initial value.

7. A base station for adapting prioritization of a service of a user equipment over services of other user equipments, which prioritization relates to a transmission between the base station and the user equipment at a scheduling occasion, and which prioritization relates to an initial value, the base station comprising:
   a deciding circuit configured to decide that the user equipment is in congestion, when an instant scheduling bit rate for the transmission in relation to a bit rate related to the service is below a first threshold, and
   an adapting circuit configured to, when the user equipment is in congestion, adapt the prioritization by down prioritizing the service of the user equipment in relation to the initial value, until a timer in the base station has expired.

8. The base station according to claim 7, wherein the adapting circuit further is configured to down prioritize the service of the user equipment by decreasing a priority of the user equipment of a current service, or decreasing a category of the user equipment.

9. The base station according to claim 7, wherein the service is a delay sensitive service, and wherein the adapting circuit further is configured to down prioritize the service of the user equipment by removing or decrease the delay.

10. The base station according to claim 7, wherein the deciding circuit is configured to trigger the deciding that the user equipment is in congestion, when the user equipment is a scheduling candidate.

11. The base station according to claim 7, wherein the user equipment is adapted to have been reset to the initial value, and wherein the adapting circuit further is configured to not down prioritize the service of the user equipment again, until the timer has expired.

12. The base station according to claim 7, further comprising:
   a checking circuit configured to, when the user equipment is in congestion, check whether or not any one of the user equipment and the base station tries to send high priority data related to the service, and
   and wherein the adapting circuit further is configured to, when any one of the user equipment and the base station tries to send high priority data related to the service, adapt the prioritization by resetting the prioritization of the service of the user equipment to the initial value.

* * * * *